United States Patent
McBrien

(10) Patent No.: US 12,270,344 B2
(45) Date of Patent: Apr. 8, 2025

(54) CONTROLLABLE FUEL NOZZLE VALVES WITH REDUNDANCY

(71) Applicant: Hamilton Sundstrand Corporation, Charlotte, NC (US)

(72) Inventor: Gary McBrien, S. Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/238,792

(22) Filed: Aug. 28, 2023

(65) Prior Publication Data

US 2025/0075661 A1    Mar. 6, 2025

(51) Int. Cl.
*F02C 7/232* (2006.01)
*F02C 7/22* (2006.01)
*F02C 9/26* (2006.01)
*F23R 3/34* (2006.01)

(52) U.S. Cl.
CPC .............. *F02C 7/232* (2013.01); *F02C 7/222* (2013.01); *F02C 9/263* (2013.01); *F23R 3/346* (2013.01)

(58) Field of Classification Search
CPC .. F02C 7/22; F02C 7/222; F02C 7/228; F02C 7/232; F02C 9/263; F02C 9/34; F23R 3/28; F23R 3/34; F23R 3/346; F23R 3/36; F05D 2270/31; F05D 2270/62; F02M 51/06–51/08; F02M 53/04–53/08; F02M 61/00–61/12; F02M 61/16–61/167; F02M 61/18–61/205; B05B 1/16; Y10T 137/87877
See application file for complete search history.

(56) References Cited

U.S. PATENT DOCUMENTS

| | | | | |
|---|---|---|---|---|
| 3,991,561 | A * | 11/1976 | Leto | F02C 9/40 |
| | | | | 60/39.463 |
| 5,289,685 | A * | 3/1994 | Hoffa | F02C 7/222 |
| | | | | 60/746 |
| 5,349,811 | A | 9/1994 | Stickler et al. | |
| 7,036,302 | B2 | 5/2006 | Myers, Jr. et al. | |
| 7,654,092 | B2 | 2/2010 | Ryan et al. | |
| 10,495,027 | B1* | 12/2019 | Hodge | F02K 9/50 |

(Continued)

OTHER PUBLICATIONS

Extended European Search Report for EP Application No. 24197099. 5, dated Feb. 3, 2025, 6 pages.

*Primary Examiner* — William H Rodriguez
(74) *Attorney, Agent, or Firm* — Kinney & Lange, P.A.

(57) ABSTRACT

A fuel system a main manifold with an inlet and a plurality of main manifold branches. Each valve in a plurality of valves is connected in fluid communication with a respective one of the main manifold branches in the plurality of main manifold branches to receive flow from the main manifold. Each secondary manifold in a plurality of secondary manifolds connects a single one of the valves in the plurality of valves to a pair of secondary manifold branches. Each nozzle in a plurality of fuel nozzles includes a first inlet connected in fluid communication to one of the valves through one of the secondary manifold branches, and a second inlet connected in fluid communication to a different one of the valves through a different one of the secondary manifold branches so each of the fuel nozzles has a redundant connection to the main manifold through two of the valves.

20 Claims, 4 Drawing Sheets

(56) References Cited

U.S. PATENT DOCUMENTS

| | | | |
|---|---|---|---|
| 2009/0277185 A1 | 11/2009 | Goeke et al. | |
| 2010/0005776 A1* | 1/2010 | Lueck | F02C 7/232 |
| | | | 60/746 |
| 2013/0042622 A1* | 2/2013 | Zebrowski | F02C 7/232 |
| | | | 60/734 |
| 2014/0061327 A1* | 3/2014 | Hughes | F23R 3/346 |
| | | | 239/533.2 |
| 2015/0204244 A1* | 7/2015 | Williams | F02C 9/40 |
| | | | 60/776 |
| 2016/0169121 A1 | 6/2016 | Mccabe | |
| 2018/0135533 A1* | 5/2018 | Sorato | F23R 3/28 |
| 2022/0213837 A1* | 7/2022 | Berger | F02C 3/30 |

* cited by examiner

| | Valve 1 | Nozzle 1 | Valve 2 | Nozzle 2 | Valve 3 | Nozzle 3 | Valve 4 | Nozzle 4 | Valve 5 | Nozzle 5 | Valve 6 | Nozzle 6 | Valve 7 | delta P across nozzles, percent |
|---|---|---|---|---|---|---|---|---|---|---|---|---|---|---|
| Nominal setting | 100 | | | | | | | | | | | | | |
| all open, normal case | 100 | 50 | 100 | 100 | 100 | 100 | 100 | 100 | 100 | 100 | 100 | 100 | 50 | 100.0% |

Fig. 4A

| | Valve 1 | Nozzle 1 | Valve 2 | Nozzle 2 | Valve 3 | Nozzle 3 | Valve 4 | Nozzle 4 | Valve 5 | Nozzle 5 | Valve 6 | Nozzle 6 | Valve 7 | delta P across nozzles, percent |
|---|---|---|---|---|---|---|---|---|---|---|---|---|---|---|
| Nominal setting | 5 | 10 | 10 | 10 | 10 | 10 | 10 | 10 | 10 | 10 | 10 | 10 | 5 | |
| all open, normal case | 5 | 10 | 10 | 10 | 10 | 10 | 10 | 10 | 10 | 10 | 10 | 10 | 5 | 316.2% |

Fig. 4B

| | Valve 1 | Nozzle 1 | Valve 2 | Nozzle 2 | Valve 3 | Nozzle 3 | Valve 4 | Nozzle 4 | Valve 5 | Nozzle 5 | Valve 6 | Nozzle 6 | Valve 7 | delta P across nozzles, percent |
|---|---|---|---|---|---|---|---|---|---|---|---|---|---|---|
| Nominal setting | 100 | 100 | 100 | 100 | 0 | 50 | 100 | 100 | 100 | 100 | 100 | 100 | 50 | |
| Valve 3 faulted completely closed, no adjustment | 50 | 100 | 100 | 50 | 0 | 50 | 100 | 100 | 100 | 100 | 100 | 100 | 50 | 100.0% |
| Valve 3 faulted closed after adjustment, flows now balanced | 0 | 50 | 100 | 50 | 0 | 50 | 100 | 100 | 0 | 50 | 100 | 50 | 0 | 141.4% |

Fig. 5A

| | Valve 1 | Nozzle 1 | Valve 2 | Nozzle 2 | Valve 3 | Nozzle 3 | Valve 4 | Nozzle 4 | Valve 5 | Nozzle 5 | Valve 6 | Nozzle 6 | Valve 7 | delta P across nozzles, percent |
|---|---|---|---|---|---|---|---|---|---|---|---|---|---|---|
| Nominal setting | 50 | 50 | 50 | 50 | 50 | 50 | 50 | 50 | 50 | 50 | 50 | 50 | 50 | |
| Valve 3 faulted completely open no adjustment | 25 | 50 | 50 | 75 | 100 | 75 | 50 | 50 | 50 | 50 | 50 | 50 | 25 | 100.0% |
| Valve 3 faulted open after adjustment, flows now balanced | 50 | 50 | 0 | 50 | 100 | 50 | 0 | 50 | 100 | 50 | 0 | 50 | 50 | 100.0% |

Fig. 5B

| | Valve 1 | Nozzle 1 | Valve 2 | Nozzle 2 | Valve 3 | Nozzle 3 | Valve 4 | Nozzle 4 | Valve 5 | Nozzle 5 | Valve 6 | Nozzle 6 | Valve 7 | delta P across nozzles, percent |
|---|---|---|---|---|---|---|---|---|---|---|---|---|---|---|
| Nominal setting | 50 | 50 | 50 | 50 | 50 | 50 | 50 | 50 | 50 | 50 | 50 | 50 | 50 | |
| various bias | 35 | 50 | 30 | 50 | 70 | 55 | 40 | 40 | 40 | 50 | 60 | 55 | 25 | 100.0% |
| percentage from average | | 100.00% | | 100.00% | | 110.00% | | 80.00% | | 100.00% | | 110.00% | | 100.00% |

CONTROLLABLE FUEL NOZZLE VALVES WITH REDUNDANCY

BACKGROUND

1. Field

The present disclosure relates to gas turbine engines, and more particularly to fuel injection in gas turbine engines.

2. Description of Related Art

Modern gas turbine engines and other applications may incorporate numerous flow valves to perform the required functions of the system. For example gas turbine engines above a certain size may typically have numerous fuel flow nozzles, which spray fuel into the combustor, so that the fuel can be burned. Performance requirements for the system typically require levels of matching of fuel flow from one nozzle to another, and in some cases, deliberate mismatching of fuel flow. Typically fuel nozzles are manufactured, assembled and tested to achieve matching of fuel flows at specified pressures. Typical nozzles may incorporate moving parts that allow the nozzle area to change or increase as the flow increases, to optimize the pressure drop across the nozzle. Once fielded and in use, nozzles will wear and will accumulate deposits and collect contaminants that will affect calibration.

If a single valve in a system with a plurality of valves and nozzles were to stick partially open or closed, or be completely open or closed as an uncommanded condition related to a failure mode, there would be no other means of control to remedy the condition to restore the correct flow to the downstream nozzle. The nozzle path in question would provide either too much flow or not enough, and either of these conditions can result in engine wear, damage, and/or performance issues. Redundancy is desirable, however to use redundant valves on each nozzle is a full doubling of much of the hardware, further worsening the adverse tradeoff of increased weight, size, and complexity.

The conventional techniques have been considered satisfactory for their intended purpose. However, there is an ever present need for improved systems and methods for individually controllable fuel injection nozzles with redundancy, that can provide optimum functionality with the potential for the most efficient use of hardware possible. This disclosure provides a solution for this need.

SUMMARY

A fuel system includes a main manifold with an inlet configured to receive fuel from a fuel source, and a plurality of main manifold branches each in fluid communication to receive flow from the inlet. A plurality of valves is included, wherein each valve in the plurality of valves is connected in fluid communication with a respective one of the main manifold branches in the plurality of main manifold branches to receive flow from the main manifold. A plurality of secondary manifolds is included, wherein each secondary manifold in the plurality of secondary manifolds connects a single one of the valves in the plurality of valves to a pair of secondary manifold branches. Each nozzle in a plurality of fuel nozzles includes a first inlet connected in fluid communication to one of the valves through one of the secondary manifold branches, and a second inlet connected in fluid communication to a different one of the valves through a different one of the secondary manifold branches so each of the fuel nozzles has a redundant connection to the main manifold through two of the valves.

Each of the valves can include a single outlet. Each of the secondary manifolds can include a main flow path connected to a respective one of the outlets of a respective one of the valves. Each of the secondary manifolds can include a first branch connected in fluid communication to the main flow path, wherein one of the fuel nozzles is connected in fluid communication to the first branch, and a second branch connected in fluid communication to the main flow path, wherein a different one of the fuel nozzles is connected in fluid communication to the second branch.

A first end valve can be in fluid communication with a first end branch of the main manifold that is connected in fluid communication to the main manifold in parallel with the main manifold branches. The first end valve can be in fluid communication with only one fuel nozzle, which itself can be redundantly connected to receive flow from one of the fuel valves in the plurality of valves. A second end valve in fluid communication with a second end branch of the main manifold that can be connected in fluid communication to the main manifold in parallel with the main manifold branches and with the first end branch. The second end valve can be in fluid communication with only one fuel nozzle, which can itself be redundantly connected to receive flow from one of the one of the fuel valves in the plurality of fuel valves. The first and second end valves can be connected to two different fuel nozzles.

Each valve in the plurality of valves can be connected to a controller for individual control of each valve. The controller can be configured to receive a command indicative of overall flow through the main manifold to achieve a commanded engine output, and to control each valve in the plurality of valves to distribute the overall flow from the main manifold through the plurality of nozzles.

The controller can be configured to detect a deviated valve among the plurality of valves that is more closed than its commanded state, and to compensate for the deviated valve by decreasing flow rates of one or more other valves in the plurality of valves to achieve even distribution among the plurality of fuel nozzles. A main metering valve can be in fluid communication with the inlet of the main manifold, wherein the main metering valve is operatively connected to the controller, and wherein the controller is configured to command the main metering valve to adjust overall flow to the main manifold to achieve the commanded engine output to the greatest extent possible.

The controller can be configured to detect a deviated valve among the plurality of valves that is more open than its commanded state, and to compensate for the deviated valve by increasing flow rates of one or more other valves in the plurality of valves to achieve even distribution among the plurality of fuel nozzles. A main metering valve can be in fluid communication with the inlet of the main manifold, wherein the main metering valve is operatively connected to the controller, and wherein the controller is configured to command the main metering valve to adjust overall flow to the main manifold to achieve the commanded engine output to the greatest extent possible. The controller can be configured to detect an imbalance in flow among the fuel nozzles and to adjust at least one of the valves to balance the flow among the fuel nozzles. The controller can be configured to detect a condition where it is desirable to deliberately imbalance flow among the fuel nozzles and to adjust at least one of the valves to deliberately imbalance the flow among the fuel nozzles.

Each of the valves can include a first valve outlet and a second valve outlet. Each of the secondary manifolds can include a first branch connected in fluid communication to the first valve outlet, respectively, wherein one of the fuel nozzles is connected in fluid communication to the first branch, and a second branch connected in fluid communication to the second valve outlet, respectively, wherein a different one of the fuel nozzles is connected in fluid communication to the second branch. Each of the first branches can include a first pilot branch and a parallel first main branch, wherein each of the second branches includes a second pilot branch and a parallel second main branch. Each of the valves can be a proportional valve configured to first issue fuel to the first and second pilot branches below a main pressure threshold, and to issue fuel above the main pressure threshold to the first and second main branches for redundant, staged fuel injection from the fuel nozzles.

A method of fuel injection includes receiving a command indicative of overall flow through a main manifold to achieve a commanded engine output and controlling each valve in a plurality of valves to distribute the overall flow from the main manifold through a plurality of nozzles. There are N+1 valves in the plurality of valves wherein there are N nozzles in the plurality of nozzles. For each valve among N−1 of the valves is connected to two separate ones of the nozzles, and each of 2 of the valves is connected to only one of the nozzles. Each of the nozzles is connected to be supplied by at least two of the valves in the plurality of valves.

The method can include detecting a deviated valve among the plurality of valves that is more closed than its commanded state and compensating for the deviated valve by decreasing flow rates of one or more other valves in the plurality of valves to achieve even distribution among the plurality of fuel nozzles. The method can include commanding a main metering valve to adjust overall flow to the main manifold to achieve the commanded engine output to the greatest extent possible.

The method can include detecting a deviated valve among the plurality of valves that is more open than its commanded state, and compensating for the deviated valve by increasing flow rates of one or more other valves in the plurality of valves to achieve even distribution among the plurality of fuel nozzles. The method can include commanding a main metering valve to adjust overall flow to the main manifold to achieve the commanded engine output to the greatest extent possible.

The method can include at least one of detecting an imbalance in flow among the fuel nozzles and adjusting at least one of the valves to balance the flow among the fuel nozzles, and/or detecting a condition where it is desirable to deliberately imbalance flow among the fuel nozzles and adjusting at least one of the valves to deliberately imbalance the flow among the fuel nozzles.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 4A shows valve and nozzle flows for the system of FIG. 1 for normal, matched flow with increased pressure differential relative to Table 1;

FIG. 4B shows valve and nozzle flows for an example where one of the valves in FIG. 1 is failed shut;

FIG. 5A shows valve and nozzle flows for an example where one of the valves in FIG. 1 is failed open; and FIG. 5B shows valve and nozzle flows for an example where flow to the nozzles is deliberately imbalanced.

DETAILED DESCRIPTION OF THE PREFERRED EMBODIMENTS

Figure 1:
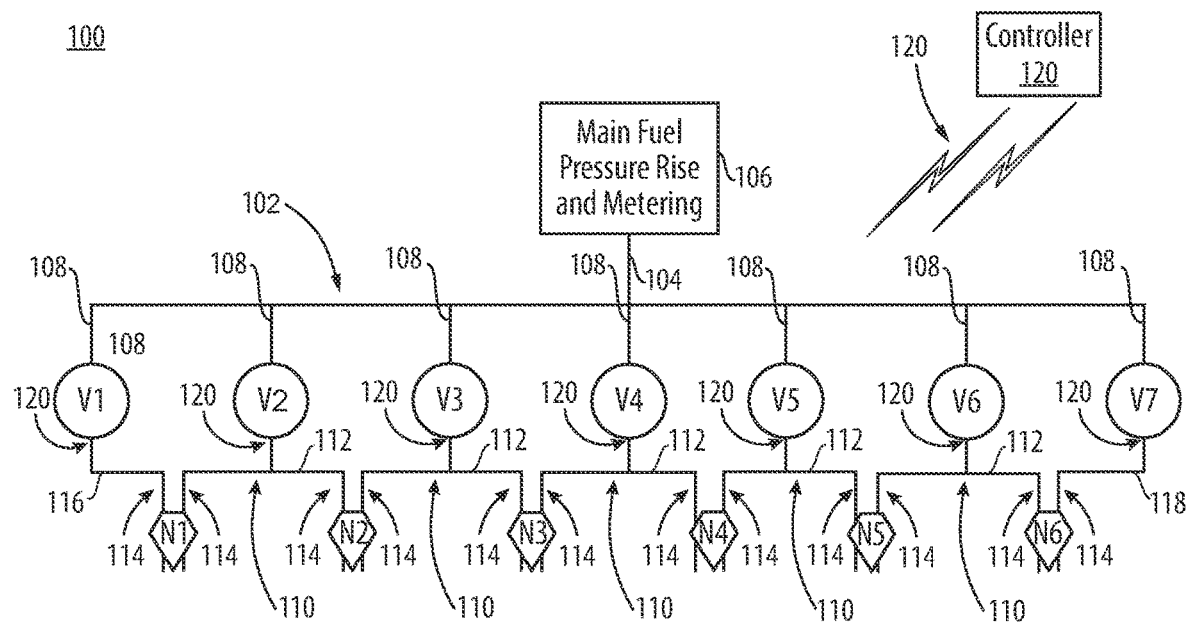
FIG. 1 is a schematic view of an embodiment of a fuel injection system constructed in accordance with the present disclosure, showing the main manifold, the valves, and the secondary manifolds for redundant distribution of fuel to the fuel nozzles.

Reference will now be made to the drawings wherein like reference numerals identify similar structural features or aspects of the subject disclosure. For purposes of explanation and illustration, and not limitation, a partial view of an embodiment of a fuel injection system in accordance with the disclosure is shown in FIG. 1 and is designated generally by reference character 100. Other embodiments of systems in accordance with the disclosure, or aspects thereof, are provided in FIGS. 2-5A, as will be described. The systems and methods described herein can be used to provide redundancy in valving for individual control of fuel nozzles, e.g. in gas turbine engines.

The fuel system 100 includes a main manifold 102 with an inlet 104 configured to receive fuel from a fuel source, i.e. from a fuel tank metered from a main metering valve 106 that feed flow into the inlet 104. A plurality of main manifold branches 108 each in fluid communication to receive flow from the inlet 104. A plurality of valves V1-V7 is included, which in this disclosure is shown and described as seven valves, however those skilled in the art will readily appreciate that any suitable number of valves can be used without departing from the scope of this disclosure. Each of the valves V1-V7 is connected in fluid communication with a respective one of the main manifold branches 108 to receive flow from the main manifold 102.

A plurality of secondary manifolds 110 is included, wherein each secondary manifold 110 connects a single one of the valves V2-V6 to a pair of secondary manifold branches 112. Each nozzle in a plurality of fuel nozzles N1-N6 includes two inlets 114. For nozzles N2-N5, each of the two respective inlets 114 is connected in fluid communication to a different one of the valves V2-V6 through one of the secondary manifold branches 112 so each of the fuel nozzles N2-N5 has a redundant connection to the main manifold 102 through two of the valves V2-V6.

Valve V1 and nozzle N1 are a special case. Valve V1 is an end valve in fluid communication with a first end branch 108 of the main manifold 102 that is connected in fluid communication to the main manifold in parallel with rest of the main manifold branches 108. But the end valve V1 is in fluid communication with only one fuel nozzle N1 through a solo end branch 116 of the secondary manifold branches 112. Nozzle N1 is itself redundantly connected to receive flow from the fuel valves V2, i.e. one of the inlets 114 of the nozzle N1 is connected to the valve V1, and the other inlet 114 of the nozzle N1 is connected to the valve V2.

Similarly, a second end valve V7 in fluid communication with a second end branch 108 of the main manifold 102 that is connected in fluid communication to the main manifold in parallel with the rest of the main manifold branches 108. The second end valve V7 is in fluid communication with only one fuel nozzle N6 through the solo end branch 118 of the secondary manifold branches 112. The nozzle N6 is itself redundantly connected to receive flow from the fuel valves V6, i.e. one of the inlets of the nozzle N6 is connected to the valve V7, and the other inlet 114 of the nozzle N1 is connected to the valve V6. In some applications, depending on the requirements for redundancy, it may be acceptable to have valves V1 and V7 replaced by a single valve connected like the others, to in effect form a ring. Although the ring configuration reduces the system by one valve, it may or may not meet redundancy and performance goals, depending on the specific application.

In a more general case of this valve and manifold arrangement, the number of the valves, e.g. V1-Vm, is n+1 where the number of fuel nozzles N1-Nn is n. Two of the valves V1 and Vm are end valves as described above each connecting only to one valve, and N–1 of the valves (V2-Vn) each connect to two of the nozzles N1-Nn. Each of the nozzles N1-Nn is connected redundantly to two of the valves V1-Vm. The flow area or flow capability of valves on the ends, in this case V1 and Vm, is half that of the middle valves in this case V2 through Vn. The end valves V1 and Vn separately allow to compensate if one valve among V1-Vm fails, because V1 and Vm only feed one nozzle each, so they can fully compensate for other valve adjustments among valves V1-Vm. For example, if valve V3 stuck, valve V2 adjusts to compensate, but that affects nozzles N1 and N2. So nozzle V1 can compensate for that effect on nozzle N1. The redundancy in this arrangement allows for accommodating one valve failure from fully open to fully closed among the values V1-Vm. The redundancy can accommodate additional failures between open and closed as well, as long as no two of the valves V1-Vm in a row adjacent and fail, the redundancy disclosed herein can accommodate multiple valve failures. The odds of more than one valve failure are very low. Fully or even partially accommodating a single failure of this type of function is typically acceptable by many industry standards.

Each valve V1-V7 is connected to a controller 120 for individual control of each valve V1-V7. The controller 120 is also connected to control the main metering valve 106. The controller 120 is configured, e.g. with machine readable instructions, digital logic, analogue circuitry, or the like, to receive a command indicative of overall flow through the main manifold 102 to achieve a commanded engine output, and control each valve V1-V7 to distribute the overall flow from the main manifold 102 through the plurality of nozzles N1-N6.

The principle of operation is that for each nozzle N1-N6, there are two valves V1-V7 feeding it. For example valves V2 and V3 each independently provide fuel pressure/flow to nozzle N2. The flow from valves V2 and V3 can pass through a separate outlet orifice or orifices in nozzle N2, so that each flow is independent. The two flows add at the output of nozzle N2, but they are completely separate fluidically, up to the point of exit into the air of the combustor, where they add to each other by way of physical proximity only at the exit of the fuel nozzle N2. The exit holes in the nozzle N2 can be arranged so the combustor reacts to the total flow at N2, and does not vary whether most of the flow comes from the V2 valve, the V3 valve, or some combination of the two. This could be accomplished for example by alternating exit holes from V2 based holes, then V3 based holes, then V2 based and so forth, around the perimeter of the nozzle.

In this way the total flow out of nozzle N2 is the sum of flows nozzle N2 receives from valves V2 and V3. Valve flow and/or valve position sensors, or command to output calibration in each valve V1-V2 or nozzle path can provide feedback 122 to the controller 120 (which can also include feedback from the main metering valve 106). The system 100 includes a main metering path which can include flow measurement or can be calibrated for accurate flow output. The system 100 can thus deliver a known flow to the engine, e.g. a gas turbine engine. The individual flow valves V1-V7 and flow nozzles N1-N6 influence how the total flow is divided across the nozzles.

Figures 3A, 3B:
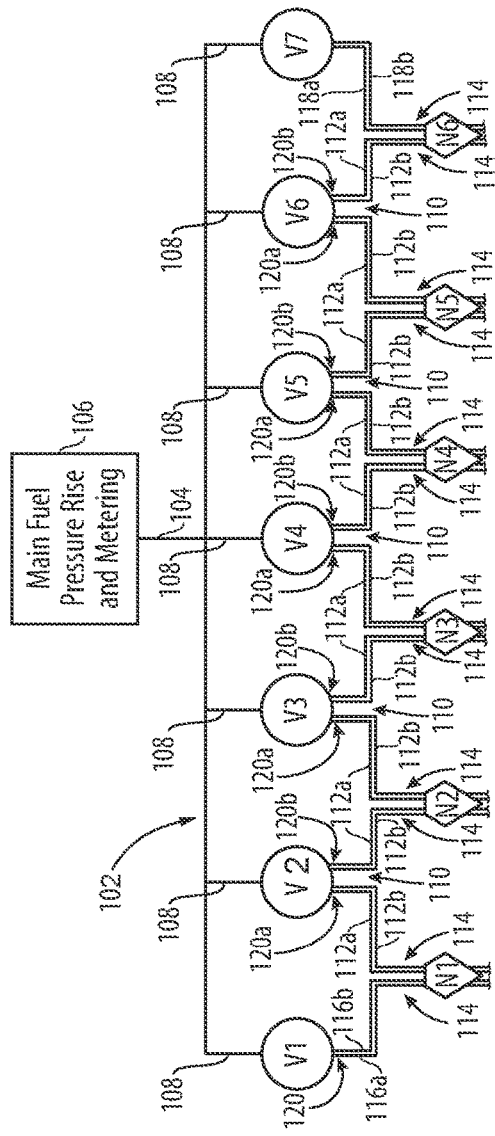
FIG. 3A is a schematic perspective view of the system of FIG. 2, with additional secondary manifolding for staged injection.
FIG. 3B shows valve and nozzle flows for the system in FIG. 1 for normal matched flow.

A mode of normal matched flow is shown in FIG. 3B for the system 100. In FIGS. 3B-5B, the valve positions for valves V1-V7 are shown as a percent area of 100%, and the resulting flow to each of the nozzles N1-N6 is also shown. FIG. 3B shows a nominal case with all valves V1-V7 open and flow going evenly to all nozzles N1-N6. In this case the flow is matched across all nozzles N1-N6. The pressure drop across the nozzles N1-N6 and valves V1-V7 is minimized, meaning all valves V1-V7 are set to open 100% and the pressure drop across nozzles N1-N6 is 100%.

A mode of normal matched flow, with higher pressure differential is shown in FIG. 4A. In FIG. 4A, the valves V1-V7 are all partially closed down equally. This increases the pressure drop across the valve-nozzle combination. This makes the system 100 resistant to flow mismatch due to dirty or clogged nozzles and valves, and also makes the system 100 less prone to combustor oscillations, as the flow is more steady regardless of upstream or downstream pressure oscillations. With all valves V1-V7 set to e.g. 10% of their fully open state, the overall pressure drop across the nozzles N1-N6 is 316% relative to the 100% of FIG. 3B.

With reference now to FIG. 4B, a mode is shown for system 100 of FIG. 1 when one of the valves V1-V7 is failed shut. In this case, valve V3 is shown failed closed or mostly closed as an example. As a result of valve V3 being failed, nozzles N2 and N3 would (without some kind of adjustment) exhibit half the desired flow, since the valve areas are half of that desired for each of nozzles N2 and N3, as shown in the first row of Table 3. To compensate, the controller 120 of FIG. 1 can open the adjacent valves V2, V4, and V6 are each opened to 100%, and valves V1 and V7 are closed to 0%. The flow areas overall are balanced across all the nozzles N1-N6, despite valve V3 being completely failed closed (as seen in the second row of the table). In this condition the overall pressure drop is increased by 41%, which is not an issue as long as the system 100 has been designed to provide a small extra amount of adequate pressure capability, or the desired flow condition could be sufficient to meet degraded system power requirements. The same capability is provided regardless of what valve V1-V7 has failed, and depending on the degree of failure, there can be failures of multiple valves at once. This can provide a default, baseline condition, so that the engine can be operated for a time to "get home" or even possibly run at full power or almost full power conditions for whole flights or even series of flights in some situations, for example if performance is retained with the redundancy technique, then using Time Limited Dispatch (TLD) statistical techniques, could be done to defer maintenance to a convenient time. Depending on the flow feedback technique used, it will also be possible to trend cases where nozzles are progressively losing calibration, in order to use prognostic techniques to predict the time at which maintenance can be satisfactorily deferred. The controller 120 of FIG. 1 is configured to detect a deviated valve V1-V7 that is more closed than its commanded state, e.g. stuck closed or operating more closed than it should be, and to compensate for the deviated valve by decreasing flow rates of one or more other valves V1-V7 in the plurality of valves to achieve even distribution among the plurality of fuel nozzles N1-N6. The controller 120 of FIG. 1 is configured to command the main metering valve 106 to adjust overall flow to the main manifold 102 to achieve the commanded engine output to the greatest extent possible. This can potentially keep the engine operating as commanded and can ensure the output of each of the nozzles N1-N6 is reasonably matched to the others.

With reference now to FIG. 1 and FIG. 5A, a case is shown for when one valve, e.g. valve V3, has failed completely open. In this case the running condition is calling for the valves V1-V7 to be about half open, or 50%. Valve V3 has failed completely open. Adjacent valves V1, V5, and V7 are adjusted to 100%(which in the case of end valves V1 and V7 is only 50% relative to the rest of the valves), and the valves V2, V4, and V6 are adjusted 0% to compensate as shown in the second row of FIG. 5A. As can be seen in FIG. 5A, flow across all nozzles N1-N6 is again balanced in the second row as with the case in Table 3. The pressure drop across the system 100 is the same as before the failure.

In this manner, the controller 120 is configured to detect any deviated valve among the plurality of valves V1-V7 that is more open than its commanded state, e.g. stuck open or operating more open than it should be, and compensate for the deviated valve by increasing flow rates of one or more other valves V1-V7 to achieve even distribution among the plurality of fuel nozzles N1-N6. The controller 120 can command the main metering valve 106 to adjust overall flow to the main manifold 102 to achieve the commanded engine output to the greatest extent possible. This can potentially keep the engine operating as commanded and can ensure the output of each of the nozzles N1-N6 is reasonably matched to the others.

With reference now to FIG. 5B and FIG. 1, a case is provided for flow adjustments to balance or unbalance nozzle flows. In this case there is a non-failure condition, however there is a desire to either balance or deliberately imbalance flows to the nozzles. In FIG. 5B, the flows are deliberately imbalanced. By the controller 120 commanding the valves V1-V7 in a coordinated fashion, the flow or area settings of each individual nozzle N1-N6 can be set, as shown by the deliberately imbalanced flow percentages in the second row of FIG. 5B. The controller 120 is configured to detect an imbalance in flow among the fuel nozzles N1-N6 and to adjust at least one of the valves V1-V7 to balance the flow among the fuel nozzles N1-N6. This can be useful to compensate for inherent inequalities in the valves V1-V7 and the nozzles N1-N6, such as from deposits building up in the system 100, manufacturing deviations, or the like. The controller 120 can also be configured to detect a condition where it is desirable to deliberately imbalance flow among the fuel nozzles N1-N6 as in FIG. 5B, and to adjust at least one of the valves V1-V7 to deliberately imbalance the flow among the fuel nozzles N1-N6. This can be useful, e.g. to produce an uneven flow pattern to counter a given state in the engine.

In FIG. 1, each of the valves V1-V7 includes a single outlet 120. Each of the secondary manifolds 110 includes a main flow path connected to the respective valve outlet 120 of one of the valves V2-V6. Each of the secondary manifolds 110, not including the solo connection branches 116, 118 for the end valves V1, V7 as described above, includes respective first and second branch 112 connecting the main flow path of the secondary manifold in fluid communication to a respective one of the fuel nozzles N1-N6.

Figure 2:
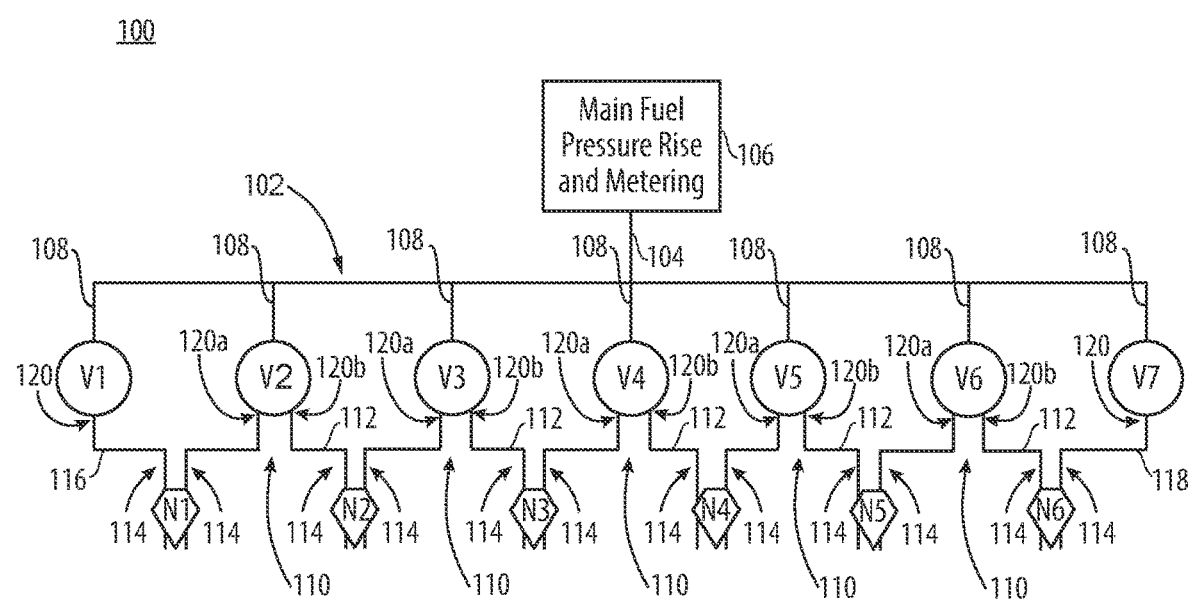
FIG. 2 is a schematic view of the system of FIG. 1, but with each valve having two outlets for supplying the fuel nozzles.

With reference now to FIG. 2, another configuration for the secondary manifolds 110 is shown. In this configuration, each of the valves V2-V6 includes a first valve outlet 120a and a second valve outlet 120b. Each of the secondary manifolds 110 includes a first branch 112 connected in fluid communication to the first valve outlet 120a, respectively, connected to an inlet 114 of one of the nozzles N1-N6, and a second branch 112 connected in fluid communication to the second valve outlet 120b, respectively, connected to an inlet 114 of a different one of the fuel nozzles N1-N6. This configuration can reduce the effects of variation form one nozzle N1-N6 to another. Each of the valves V1-V7 can be comprised of two separate, tandem flow paths that can potentially provide better fuel flow matching than a single flow path, since each path can have a larger pressure drop in the path than the pressure drop across the nozzles alone. This can provide even better flow matching, e.g. for the case in FIG. 4A, where the pressure drop is increased.

With reference now to FIG. 3, the system 100 can be staged. In many applications there is a need to provide a separate pilot path through the fuel nozzles for low flow conditions including starting the engine. During start or low flow conditions, the main flow paths through the valves can be shut off, and a pilot flow can be provided through a parallel path through each valve. In this case, each of the branches 112 of the secondary manifolds 110 includes a first pilot branch 112a and a parallel first main branch 112b, and similarly the end branches 116 and 118 can have respective parallel pilot branches 116a, 118a and main branches 116b, 118b. Each of the valves V1-V7 can be a proportional valve configured to first issue fuel to the pilot branches 112a, 116a, 118a below a main pressure threshold, and to issue fuel above the main pressure threshold to the main branches 112b, 116b, 118b for redundant, staged fuel injection from the fuel nozzles N1-N6.

The systems and methods as disclosed herein provide potential benefits including the following. These systems and methods can provide the benefits of a redundant valve on each nozzle without having to add a redundant valve to each nozzle. To achieve the capability to have a redundant backup on every nozzle, there only needs to be the addition of one more valve for the system above systems having one valve per nozzle. For most cases, with systems and methods as disclosed herein, multiple valves can be in error and the neighboring valves can compensate. Chip clearing can be done instead as chip shearing as follows. If a valve cannot be fully closed, or positioned properly, it can be opened temporarily in concert with the other valves closing so that any trapped material can be flushed clear, while maintaining the overall flow at a constant level. As described above, in the event clogging, FOD (foreign object debris), chips, or other contaminants or malfunction in the valve causing various degrees of mis-placement of the valve opening, the second channel can compensate. The adjacent valves can close or open to compensate.

The methods and systems of the present disclosure, as described above and shown in the drawings, provide for redundancy in valving for individual control of fuel nozzles, e.g. in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

Those skilled in the art will readily appreciate that each nozzle, e.g. N2, can actually be or represent one nozzle in a bank of parallel nozzles, i.e., nozzle N2 can have one or more parallel nozzles banked with it, each fed in parallel by valves V2 and V3, and nozzle N3 can be or represent a bank of parallel nozzles each fed by valves V3 and V4, and so forth. In this case, the arrangements are the same as FIG. 1, 2, or 3, however if the system configuration will allow, for cases where there are a large number of nozzles, they can be grouped together in banks to reduce the number of valves.

Likewise the arrangement with the one additional valve for the number of nozzles can be applied to any number of nozzles, as explained earlier, but this can be done on a given engine in sets as well. For example the arrangements of FIGS. 1, 2, and 3 could be done for 6 nozzles fed by 7 valves on a given engine that has 24 nozzles total, so there can be 4 sets of 6 nozzles per set, each set fed by 7 valves. So the ganging of nozzles and the grouping of valve/nozzle sets can be done to optimize the system needs, trading off complexity, reliability, safety. Performance, cost, weight, mission availability, dispatch capability, prognostic health approaches, and other constraints.

What is claimed is:

1. A fuel system comprising:
   a main manifold including an inlet configured to receive fuel from a fuel source, and a plurality of main manifold branches each in fluid communication to receive flow from the inlet;
   a plurality of valves, wherein each valve in the plurality of valves is connected in fluid communication with a respective one of the main manifold branches in the plurality of main manifold branches to receive flow from the main manifold;
   a plurality of secondary manifolds, wherein each secondary manifold in the plurality of secondary manifolds connects a single one of the valves in the plurality of valves to a pair of secondary manifold branches; and
   a plurality of fuel nozzles, wherein each nozzle in the plurality of fuel nozzles includes a first inlet connected in fluid communication to one of the valves through one of the secondary manifold branches, and a second inlet connected in fluid communication to a different one of the valves through a different one of the secondary manifold branches so each of the fuel nozzles has a redundant connection to the main manifold through two of the valves.

2. The system as recited in claim 1, wherein each of the valves includes a single outlet, wherein each of the secondary manifolds includes a main flow path connected to a respective one of the outlets of a respective one of the valves, and wherein each of the secondary manifolds includes:
   a first branch connected in fluid communication to the main flow path, wherein one of the fuel nozzles is connected in fluid communication to the first branch, and
   a second branch connected in fluid communication to the main flow path, wherein a different one of the fuel nozzles is connected in fluid communication to the second branch.

3. The system as recited in claim 1, further comprising a first end valve in fluid communication with a first end branch of the main manifold that is connected in fluid communication to the main manifold in parallel with the main manifold branches, wherein the first end valve is in fluid communication with only one fuel nozzle, which is itself redundantly connected to receive flow from one of the fuel valves in the plurality of valves.

4. The system as recited in claim 3, further comprising a second end valve in fluid communication with a second end branch of the main manifold that is connected in fluid communication to the main manifold in parallel with the main manifold branches and with the first end branch, wherein the second end valve is in fluid communication with only one fuel nozzle, which is itself redundantly connected to receive flow from one of the one of the fuel valves in the plurality of fuel valves, wherein the first and second end valves are connected to two different fuel nozzles.

5. The system as recited in claim 1, wherein each valve in the plurality of valves is connected to a controller for individual control of each valve.

6. The system as recited in claim 1, wherein the controller is configured to:
   receive a command indicative of overall flow through the main manifold to achieve a commanded engine output; and
   control each valve in the plurality of valves to distribute the overall flow from the main manifold through the plurality of nozzles.

7. The system as recited in claim 6, wherein the controller is configured to:
   detect a deviated valve among the plurality of valves that is more closed than its commanded state; and
   compensate for the deviated valve by decreasing flow rates of one or more other valves in the plurality of valves to achieve even distribution among the plurality of fuel nozzles.

8. The system as recited in claim 7, further comprising a main metering valve in fluid communication with the inlet of the main manifold, wherein the main metering valve is operatively connected to the controller, and wherein the controller is configured to command the main metering valve to adjust overall flow to the main manifold to achieve the commanded engine output to the greatest extent possible.

9. The system as recited in claim 6, wherein the controller is configured to:
   detect a deviated valve among the plurality of valves that is more open than its commanded state; and
   compensate for the deviated valve by increasing flow rates of one or more other valves in the plurality of valves to achieve even distribution among the plurality of fuel nozzles.

10. The system as recited in claim 9, further comprising a main metering valve in fluid communication with the inlet of the main manifold, wherein the main metering valve is operatively connected to the controller, and wherein the controller is configured to command the main metering valve to adjust overall flow to the main manifold to achieve the commanded engine output to the greatest extent possible.

11. The system as recited in claim 6, wherein the controller is configured to detect an imbalance in flow among the fuel nozzles and to adjust at least one of the valves to balance the flow among the fuel nozzles.

12. The system as recited in claim 6, wherein the controller is configured to detect a condition where it is desirable to deliberately imbalance flow among the fuel nozzles and to adjust at least one of the valves to deliberately imbalance the flow among the fuel nozzles.

13. The system as recited in claim 1, wherein each of the valves includes a first valve outlet and a second valve outlet, wherein each of the secondary manifolds includes:
- a first branch connected in fluid communication to the first valve outlet, respectively, wherein one of the fuel nozzles is connected in fluid communication to the first branch, and
- a second branch connected in fluid communication to the second valve outlet, respectively, wherein a different one of the fuel nozzles is connected in fluid communication to the second branch.

14. The system as recited in claim 13, wherein each of the first branches includes a first pilot branch and a parallel first main branch, wherein each of the second branches includes a second pilot branch and a parallel second main branch, wherein each of the valves is a proportional configured to first issue fuel to the first and second pilot branches below a main pressure threshold, and to issue fuel above the main pressure threshold to the first and second main branches for redundant, staged fuel injection from the fuel nozzles.

15. A method of fuel injection comprising:
- receiving a command indicative of overall flow through a main manifold to achieve a commanded engine output; and
- controlling each valve in a plurality of valves, comprised of center valves and two end valves, to distribute the overall flow from the main manifold through a plurality of nozzles, wherein there is one more valve in the plurality of valves than there are nozzles in the plurality of nozzles, wherein each valve among the center valves of the plurality of the valves is connected to two separate ones of the nozzles, and both of the two end valves of the plurality of valves are connected to only one of the nozzles, and wherein each of the nozzles of the plurality of nozzles is connected to be supplied by at least two of the valves in the plurality of valves.

16. The method as recited in claim 15, further comprising:
- detecting a deviated valve among the plurality of valves that is more closed than its commanded state; and
- compensating for the deviated valve by decreasing flow rates of one or more other valves in the plurality of valves to achieve even distribution among the plurality of fuel nozzles.

17. The method as recited in claim 16, further comprising commanding a main metering valve to adjust overall flow to the main manifold to achieve the commanded engine output to the greatest extent possible.

18. The method as recited in claim 15, further comprising:
- detecting a deviated valve among the plurality of valves that is more open than its commanded state; and
- compensating for the deviated valve by increasing flow rates of one or more other valves in the plurality of valves to achieve even distribution among the plurality of fuel nozzles.

19. The method as recited in claim 18, further comprising commanding a main metering valve to adjust overall flow to the main manifold to achieve the commanded engine output to the greatest extent possible.

20. The method as recited in claim 16, further comprising at least one of:
- detecting an imbalance in flow among the fuel nozzles and adjusting at least one of the valves to balance the flow among the fuel nozzles; and/or
- detecting a condition where it is desirable to deliberately imbalance flow among the fuel nozzles and adjusting at least one of the valves to deliberately imbalance the flow among the fuel nozzles.

* * * * *